United States Patent [19]

Sorensen

[11] Patent Number: 4,467,786

[45] Date of Patent: Aug. 28, 1984

[54] SOLAR HEATING OF WATER UTILIZING COVERITES

[75] Inventor: Jens O. Sorensen, Rancho Santa Fe, Calif.

[73] Assignee: Soren Christian Sorensen, Rancho Santa Fe, Calif.

[21] Appl. No.: 469,562

[22] Filed: Mar. 2, 1983

Related U.S. Application Data

[63] Continuation-in-part of Ser. No. 320,484, Nov. 12, 1981, abandoned.

[51] Int. Cl.³ ............................................... F24J 3/02
[52] U.S. Cl. .................................... 126/415; 126/426; 4/499
[58] Field of Search ............... 126/415, 416, 400, 426; 4/498, 499

[56] References Cited

U.S. PATENT DOCUMENTS 3,998,204  12/1976  Fuchs et al. ......................... 126/415
4,109,325   8/1978  Shuff ........................................ 4/499

Primary Examiner—Samuel Scott
Assistant Examiner—Noah Kamen
Attorney, Agent, or Firm—Brown & Martin

[57] ABSTRACT

A method and a system of solar heating a body of water, which has its surface exposed to air and radiation from the sun, by covering the surface of the body of water with a floating blanket consisting of thousands of coverites. Each coverite is a sealed bag with its wall comprising a thin flexible translucent film of plastic, which encases a translucent liquid and a translucent gas, so that each coverite compresses its neighboring coverites, whereby its thin flexible wall conforms to the shape of the contacting part of the neighboring coverites' thin flexible walls, whereby the resulting blanket of coverites admits the solar radiation to reach the body of water, and reduces heat absorbing evaporation of the body of water to the air, and thermally insulates the body of water from the air. The liquid and the gas may conveniently be water and air respectively and the plastic may suitably be a polyolefin such as polyethylene.

20 Claims, 6 Drawing Figures

SOLAR HEATING OF WATER UTILIZING COVERITES

This is a continuation in part application of patent application 320,484 filed Nov. 12, 1981 abandoned Feb. 6, 1984 entitled SOLAR HEATING OF WATER UTILIZING COVERITES by the same inventor.

FIELD OF THE INVENTION

The invention relates to solar heating of bodies of water which has its surface exposed to air and solar radiation, and specifically to an improved method and system wherein the surface of the water is covered in order to reduce heat absorbing evaporation of the water to the air.

DISCUSSION OF PRIOR ART

Heretofore a thin film of oil has been suggested for covering bodies of water in order to reduce evaporation. Unfortunately the oil is very polluting to the environment. For example, birds will get covered by the oil and die, and other organisms will be poisoned. Furthermore, the thin film of oil has very little insulating effect and heat escapes from the body of water to the air by simple heat conduction. It has also been suggested to cover the surface of the water with a film of plastic, but unfortunately it is very costly to repair the plastic film once it is ruptured and rain water has a tendency to collect on top of the plastic film, giving rise to problems of removing the rain water which, when evaporating, cools the body of water.

OBJECTS OF THE INVENTION

A method and system of heating bodies of water will be described which is not polluting to the environment, which insulates the body of water from the air in order to reduce heat loss, which is less costly to repair because it tends to repair itself and which does not collect water on its upper surface.

SUMMARY OF THE INVENTION

The invention provides a method and a system of solar heating a body of water which has its surface exposed to air and radiation from the sun. The heating is achieved by covering the surface of the body of water with a floating blanket consisting of thousands of coverites. Each coverite is a sealed bag with its wall comprising a thin flexible translucent film of plastic which encases a translucent liquid and a translucent gas, so that each coverite compresses its neighboring coverites, whereby its thin flexible wall conforms to the shape of the contacting part of the neighboring coverites' thin flexible walls, whereby the resulting blanket of coverites admits the solar radiation to reach the body of water and reduces heat absorbing evaporation of the body of water to the air, and thermally insulates the body of water from the air. The liquid and the gas may conveniently be water and air respectively and the plastic may suitably be a polyolefin such as polyethylene or polypropylene. The coverites may be compartmented. Small amounts of surfactant may be added to the liquid in order to control condensation of vapor on the inside wall of the coverites. In order to prevent the wind from causing the coverites to accumulate at one end of the body of water, the blanket of coverites may be placed in separate frames in a floating framework. It is an advantage that the bottom of the body of water is of a dark color, in order to maximize absorbtion and minimize the reflection of solar radiation. Further objects and advantages of my invention will become apparent from a consideration of the drawings and the description thereof.

DESCRIPTION OF THE PREFERRED EMBODIMENTS

Figure 1:
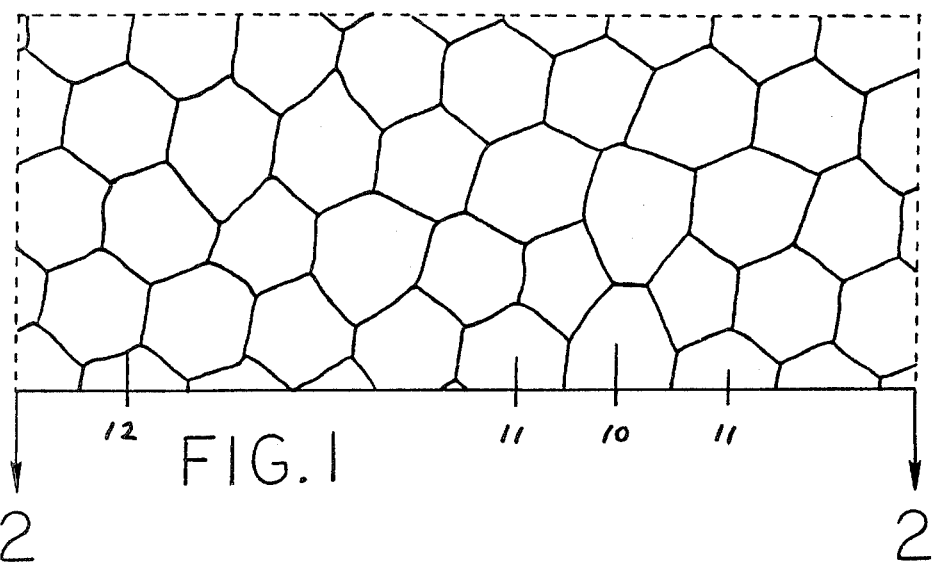
FIG. 1 shows a segment of a blanket of coverites of a preferred embodiment of the invention seen from above.
Figure 2:
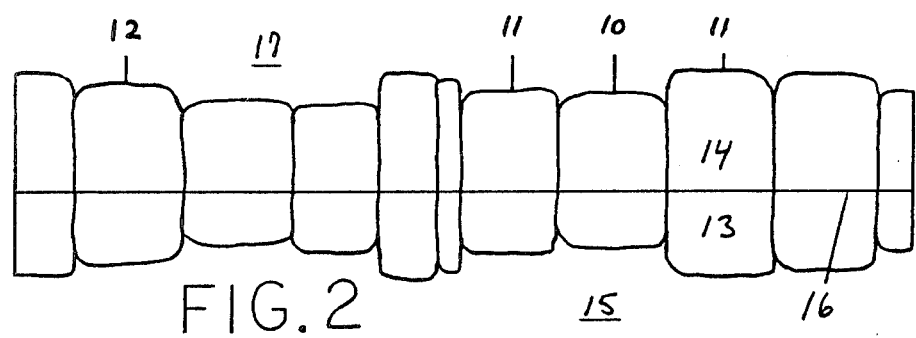
FIG. 2 is a sectional view of FIG. 1 taken through a plane indicated by section line 2—2 in FIG. 1 seen from the side.

FIGS. 1 and 2 show a segment of a blanket consisting of thousands of coverites 10 and 11 seen in FIG. 1 from above and seen in FIG. 2 from the side. Each coverite is a sealed bag with its wall 12 comprising a thin translucent film of polyethylene plastic which encases a translucent liquid of water 13 and a translucent gas of air 14. Each coverite 10 presses against its neighboring coverites 11 whereby its thin flexible wall 12 conforms to the shape of the contacting part of the neighboring coverites' thin flexible walls 12. Above the blanket of coverites 10 and 11 is air 17. The blanket of coverites 10 and 11 floats on a body of water 15. The surface of the body of water 15 and the surface 16 of the liquid of water 13 inside the coverites 10 and 11 are approximately at the same elevation. The liquid and the gas inside the coverite may be separated by a film of plastic at 16 to prevent condensation of liquid on the upper wall of the coverite.

The radiation from the sun, not shown, comes from above and passes through the blanket of coverites 10 and 11, since the gas of air 14 and the liquid of water 13 and the polyethylene plastic all are translucent. The radiation from the sun continues into the body of water 15 where it is converted into heat. Some of the radiation will strike the bottom of the water, not shown, which has a dark color and the radiation will here be converted to heat, which will be transferred to the body of water 15 by conduction and convection. The blanket of coverites 10 and 11 reduces heat loss from the heated water 15. The continuous blanket of coverites reduces heat absorbing evaporation from the body of water 15 to the air 17, and thermally insulates the body of water 15 from the air 17, since the gas of air 14 inside the coverites 10 and 11 is a good heat insulator. All warm bodies radiate away energy, also the heated body of water 15 which radiates a low frequency infrared light, but since the wall of polyethylene plastic 12 is opaque to radiation of this frequency, this energy is trapped and returned to the body of water 15. In fact, the coverites act as a heat trap reducing all four types of heat losses, namely conduction, convection, evaporation and radiation. It is expected that the temperature would not be significantly reduced during the night when the water is more than one meter deep. It should be noted that substantial solar heating of water also will take place on a cloudy day.

Figures 3, 4, 5:
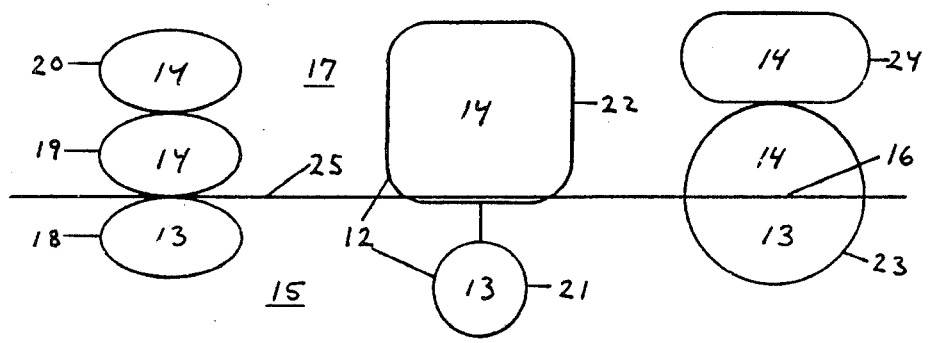
FIGS. 3, 4, and 5 show alternative preferred embodiments of coverites of the invention seen from the side.

In order to prevent algae and other biofouling organisms from growing on the coverite, it is possible to add small quantities of a chemical such as copper sulfate to the plastic. A surfactant may be added to the liquid in order to control condensation of vapor on the inside wall of the coverite and a substance such as gelatin may be added to the liquid of water in order to increase the viscosity of the liquid, in order to decrease convection in the liquid and thereby decrease heat loss by such convection. FIGS. 3, 4, and 5 show alternative embodiments of the coverites. The coverite shown in FIG. 3 consists of three separate compartments. The bottom compartment 18 is submerged below the surface 25 of the water 15 and contains a liquid of water 13; the middle compartment 19 and the upper compartment 20 are floating and upheld in the air 17 and mainly above the surface of the water 25, and contain a gas of air 14. This embodiment of a coverite has a particularly high insulating effect since heat in order to escape from the body of water 15 will have to pass through all three compartments 18, 19 and 20.

The coverite shown in FIG. 4 consists of two separate compartments. The bottom compartment 21 is submerged below the surface of the water and contains a liquid of water 13. The top compartment 22 is mainly in the air 17 floating on the body of water 15 and contains a gas of air 14. The bottom compartment 21 is connected to the top compartment 22 and its wall 12 encases the liquid of water 13 and the gas of air 14.

The coverite shown in FIG. 5 consists of two separate compartments. The bottom compartment 23 floats in the body of water 15. Some of the compartment 23 is below the surface of the water 15 and some of the compartment 23 is in the air 17 above the surface 25 of the water 15. The surface 25 of the body of water 15 and the surface 16 of the liquid of water 13 inside the compartment 23 are approximately at the same elevation. The top compartment 24 is elevated in the air 17 and contains a gas of air 14. This embodiment of a coverite has a very high insulating effect since heat in order to escape from the body of water 15 will have to pass through the liquid of water 13 and the gas of air 14 of the bottom compartment 23, and the gas of air 14 of the top compartment 24.

Figure 6:
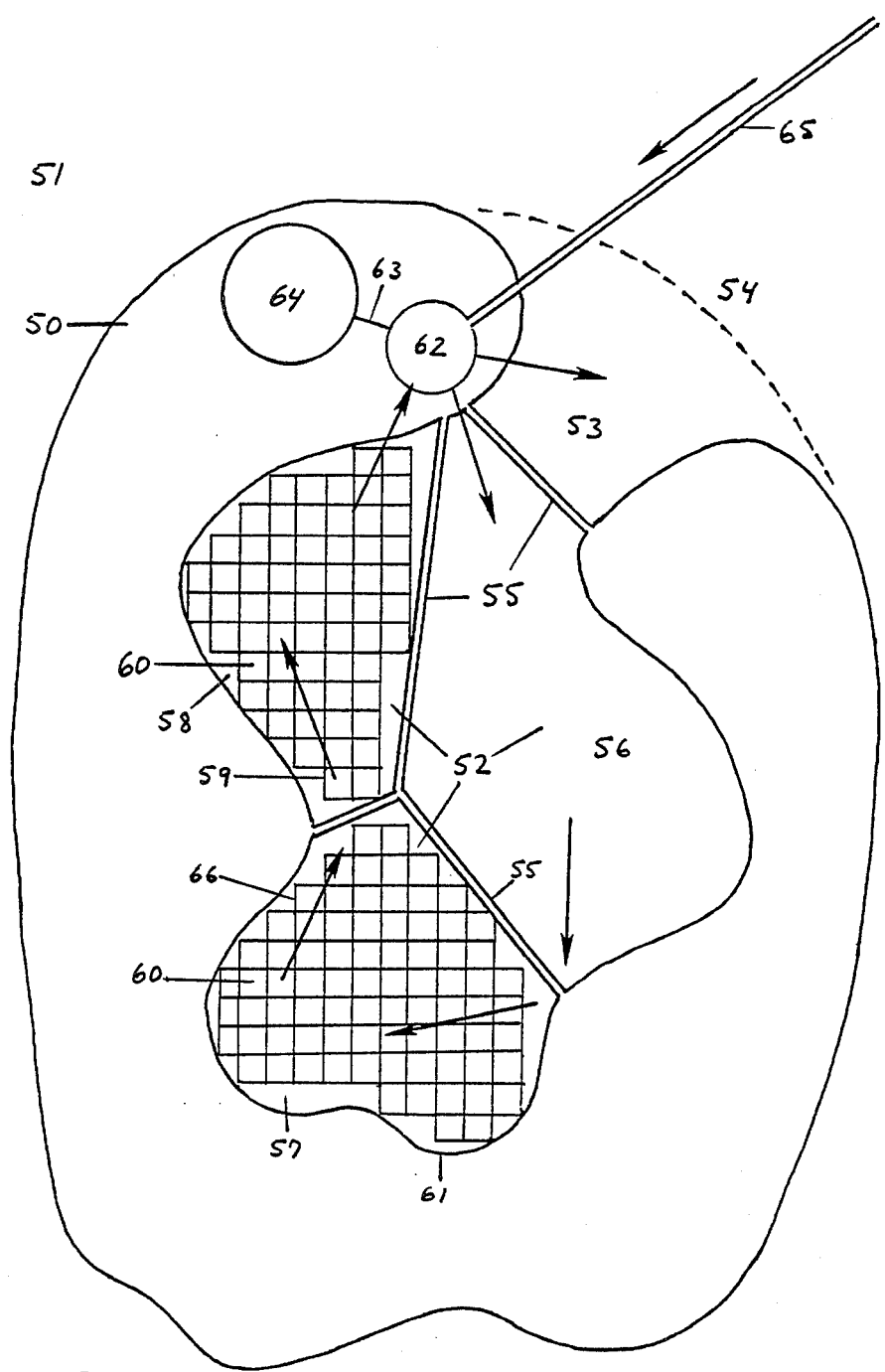
FIG. 6 is a schematic diagram which shows a body of water being heated by the sun utilizing coverites and a floating framework of the invention seen from above.

FIG. 6 illustrates how the solar heating of water utilizing coverites can be used to facilitate most of man's basic needs, such as power, fresh water, irrigation for agriculture, aquaculture, and chemicals such as fuel, fertilizer and purification of minerals.

Shown in FIG. 6 is a tropical island 50 in the ocean 51. In the interior of the island is a lagoon 52 which is connected to the ocean 51 through the opening 53. A coral reef 54 shields the opening 53 of the lagoon 52 from tall waves.

A number of dykes 55 have been built whereby the body of water in the lagoon has been divided into a number of basins: a basin 56 for aquaculture, a basin 57 for primary heating of water, and a basin 58 for secondary heating of water. In each of the basins for heating of water 57 and 58, is a floating framework 59 and 66 respectively, which provides separate frames 60 into which blankets of coverites are placed. The floating frameworks 59 and 66 are moored at many places to the bottom of the lagoon 52 and to the shoreline 61 of the lagoon 52 and the dykes 55.

Located near the basin 58 for secondary heating of water is a current state-of-the-art ocean thermal energy conversion system 62 as one of the systems described for example in the Proceedings of the Eighth Ocean Energy Conference held June 7-11, 1981 in Washington, D.C. The conversion system 62 is connected by electric cable 63 to chemical plant 64. Leading from a depth of approximately 1 km on the ocean bottom to the conversion system is a cold water pipe 65.

Cold water at a temperature of 6°-7° C. is pumped via the cold water pipe to the conversion system 62. During the conversion process the temperature of the water is increased to about 26° C. at which temperature it enters the basin 56 for aquaculture. The nutrient-rich deep sea water can be used to produce seafood. As the water passes through the basin 56 for aquaculture, its temperature increases to about 29° C., at which temperature it enters the basin 57 for primary heating of water. This basin is covered with a blanket of coverites of the type illustrated in FIG. 2, the blanket of coverites is placed in separate frames of a floating framework 66. As the water passes through this basin 57 for primary heating of water its temperature increases from about 29° C. to about 40° C. at which temperature it enters the basin 58 for secondary heating of water. This basin is covered with a blanket of coverites of the type illustrated in FIG. 5, the blanket of coverites is placed in separate frames of a floating framework 59. As the water passes through this basin 58 for secondary heating of water its temperature increases from about 40° C. to about 47°, at which temperature it again enters the conversion system 62. During the conversion process the temperature of the water decreases to about 17° C. and is hereafter discarded to the ocean.

It is a common opinion that the investment cost of an ocean thermal energy conversion system is decreased by 8-25% for every 2° C. that the difference in temperature of the two incoming streams of water is increased. Since the normal surface water temperature of the tropical ocean is about 27° C., the system of the invention would heat the water an additional 20° C. and probably thereby make possible a reduction of the investment cost of the ocean thermal energy conversion system by about 60-70%. Since the cost of the invested capital of the ocean thermal energy conversion system accounts for nearly all the running expenses of the system, any saving in investment cost will decrease the cost of the produced power accordingly by about the same percentage. In the present embodiment the power is directed to a chemical plant 64 which converts ocean water to fresh water used for irrigation of local agriculture. The chemical plant 64 may also purify minerals, produce fertilizer and produce fuel for export purposes.

An ideally located island which advantageously would be able to utilize the coverites of this invention would be Grand Cayman in the Caribbean. The total required length of the cold water pipe would be less than 3 km; a lagoon of about 60 square kilometers is found on the northern part of the island which on the average is only 3 meters deep. Many other places in the world have swamps, lakes or lagoons which at present do not contribute to the economy of man, and which would be well suited for projects which would involve the heating of water.

I claim:

1. A method of solar heating a body of water which has its surface exposed to air and radiation from the sun, by covering the surface of the body of water with a floating blanket consisting of thousands of coverites; each coverite comprises a wall of thin flexible translucent plastic film, which encases a translucent liquid and a translucent gas, so that each coverite compresses its neighboring coverites, whereby its thin flexible wall conforms to the shape of the contacting part of the neighboring coverites' thin flexible walls, whereby the resulting blanket of coverites admits the solar radiation to reach the body of water, and reduces heat absorbing evaporation of the body of water to the air, and thermally insulates the body of water from the air.

2. A method according to claim 1 wherein the gas comprises air.

3. A method according to claim 1 wherein the liquid comprises water.

4. A method according to claim 1 where the plastic comprises a polyolefine such as polyethylene or polypropylene.

5. A method of solar heating a body of water which has its surface exposed to air and radiation from the sun, by covering the surface of the body of water with a floating blanket consisting of thousands of coverites; each coverite comprises a wall of thin flexible translucent plastic film, which encases a translucent liquid and a translucent gas, so that each coverite compresses its neighboring coverites, whereby its thin flexible wall conforms to the shape of the contacting part of the neighboring coverites' thin flexible walls, whereby the resulting blanket of coverites admits the solar radiation to reach the body of water, and reduces heat absorbing evaporation of the body of water to the air, and thermally insulates the body of water from the air; wherein at least some of the coverites are compartmented.

6. A method according to claim 1 wherein the gas, liquid and/or the plastic is a material which impedes the passage of low frequency infrared light, thereby reducing the escape of heat energy in the form of radiation from the body of water.

7. A method according to claim 1 wherein the blanket of coverites is placed in separate frames of a floating framework.

8. A method according to claim 5 wherein the liquid is separated from the gas by a film of plastic.

9. A method according to claim 1 wherein the viscosity of the liquid reduces heat convection of the liquid.

10. A system for solar heating a body of water which has its surface exposed to air and radiation from the sun comprising a floating blanket consisting of thousands of coverites which cover the surface of the body of water; each coverite comprises a wall of thin flexible translucent plastic film, which encases a translucent liquid and a translucent gas, so that each coverite compresses its neighboring coverites, whereby its thin flexible wall conforms to the shape of the contacting part of the neighboring coverites' thin flexible walls, whereby the resulting blanket of coverites admits the solar radiation to reach the body of water, and reduces heat absorbing evaporation of the body of water to the air, and thermally insulates the body of water from the air.

11. A system according to claim 10 wherein the gas comprises air.

12. A system according to claim 10 wherein the liquid comprises water.

13. A system according to claim 10 where the plastic comprises a polyolefine such as polyethylene or polypropylene.

14. A system for solar heating a body of water which has its surface exposed to air and radiation from the sun comprising a floating blanket consisting of thousands of coverites which cover the surface of the body of water; each coverite comprises a wall of thin flexible translucent plastic film, which encases a translucent liquid and a translucent gas, so that each coverite compresses its neighboring coverites, whereby its thin flexible wall conforms to the shape of the contacting part of the neighboring coverites' thin flexible walls, whereby the resulting blanket of coverites admits the solar radiation to reach the body of water, and reduces heat absorbing evaporation of the body of water to the air, and thermally insulates the body of water from the air; wherein at least some of the coverites are compartmented.

15. A system according to claim 10 wherein the gas, liquid and/or the plastic is a material which impedes the passage of low frequency infrared light, thereby reducing the escape of heat energy in the form of radiation from the body of water.

16. A system according to claim 10 comprising a floating framework of separate frames in which the blanket of coverites are positioned.

17. A system according to claim 14 wherein the liquid is separated from the gas by a film of plastic.

18. A system according to claim 10 wherein the liquid has a high enough viscosity to reduce heat convection of the liquid.

19. A method of thermal energy conversion comprising:
   converting the temperature differential between warm water and cold water into a useful form of energy, and
   providing the warm water for said conversion by heating a body of water which has its surface exposed to air and radiation from the sun, by covering the surface of the body of water with a floating blanket consisting of thousands of coverites; each coverite comprises a wall of thin flexible translucent plastic film, which encases a translucent liquid and a translucent gas, so that each coverite compresses its neighboring coverites, whereby its thin flexible wall conforms to the shape of the contacting part of the neighboring coverites' thin flexible walls, whereby the resulting blanket of coverites admits the solar radiation to reach the body of water, and reduces heat absorbing evaporation of the body of water to the air, and thermally insulates the body of water from the air.

20. A thermal energy conversion system comprising:
   means for converting the temperature differential between warm water and cold water into a useful form of energy; and
   means for providing the warm water for said conversion by heating a body of water which has its surface exposed to air and radiation from the sun comprising a floating blanket consisting of thousands of coverites which cover the surface of the body of water; each coverite comprises a wall of thin flexible translucent plastic film, which encases a translucent liquid and a translucent gas, so that each coverite compresses its neighboring coverites, whereby its thin flexible wall conforms to the shape of the contacting part of the neighboring coverites' thin flexible walls, whereby the resulting blanket of coverites admits the solar radiation to reach the body of water, and reduces heat absorbing evaporation of the body of water to the air, and thermally insulates the body of water from the air.

* * * * *